Patented Oct. 21, 1947

2,429,223

UNITED STATES PATENT OFFICE 2,429,223

PRESSURE-SENSITIVE ADHESIVE TAPE

Warner Eustis, Newton, Mass., and George Robert Orrill, Western Springs, Ill., assignors to The Kendall Company, Boston, Mass., a corporation of Massachusetts No Drawing. Application August 28, 1940, Serial No. 354,598

5 Claims. (Cl. 117—122)

1

This invention relates to pressure-sensitive adhesives and more particularly to a pressure-sensitive adhesive which may be applied to a variety of desirable flexible backings in the formation of pressure-sensitive adhesive tapes.

One of the essential factors controlling the usefulness of such tapes and adhesives is the aging quality of the adhesive, upon which the life of the tape in storage is dependent. Improvements in adhesive aging qualities are therefore of prime commercial importance, both from the manufacturer's and from the user's standpoints.

One of the usual methods of applying pressure-sensitive adhesives to supporting backings has been by the use of volatile solvents. The essential ingredient of these adhesives has usually been ordinary rubber, and the volatile rubber solvents utilized during the spreading operation have always had an unavoidable detrimental action on the rubber by reason of a chemically well known depolymerization of the rubber by the volatile solvent. Such depolymerization has resulted in certain undesirable characteristics in the adhesive, noticeable in the reduced aging quality.

This invention contemplates the preparation of a rubber pressure-sensitive adhesive which may be spread by a liquid spreading operation, but in which there is no destructive attack upon the rubber ingredient by volatile solvents. To this end, for the purposes of the spreading operation, a non-solvent liquid spreading medium is used so that the spreadable mix either contains no volatile rubber solvents or else contains the solid rubber and solvent ingredients of the adhesive in dispersion whereby chemical solvent action between any solvents for the rubber, if present, and the rubber is prevented, at least until substantially complete drying. Retention of the advantageous characteristics of highly polymerized rubber unaffected by volatile solvents during the formulation of the adhesive and during its application to the surface is thus accomplished.

A further object of the invention is the preparation of adhesive tapes comprising specific types of backings or supporting surfaces and in which the adhesives herein described provide novel and improved tapes.

In view of the superior advantages of rubber in its highly polymerized condition, latex has been found especially suitable for use in the practice of this invention. Latex is inherently adapted to a spreading operation by the use of a non-volatile non-solvent vehicle in the form of an aqueous dispersion, and we have found that such a dispersion may contain the necessary normally

2 solid plasticizers, which may be dissolved in non-volatile liquid solvents and thereafter dispersed in an aqueous emulsion for mixing with the latex dispersion and for subsequent spreading, without the use of volatile rubber solvents.

Other forms of highly polymerized rubber may likewise be utilized by forming initially an aqueous dispersion thereof. For instance, redispersed rubber (Dispersite) or other aqueous dispersions of reclaim rubber, latex crepe, synthetic rubbers, such as polychloroprene, Perbunan (butadiene acrylic acid nitrile mixed polymerizate), or isobutylene polymer may be used, though difficulties of dispersion indicate more practicable results with latex. Obviously, combinations of such ingredients may be found desirable. Oftentimes a partial content of prevulcanized rubber is desirable, for instance, prevulcanized latex, such as Vultex, may be included in part to secure better aging characteristics. While an aqueous emulsion of the adhesive is preferred, it is perfectly practicable to utilize a water-in-oil emulsion, the plasticizer and latex being initially dispersed in an oil and thereafter mixed together for spreading purposes. Such an oil vehicle as Resinel, usually referred to as a mixture of polymerized terpenes, is appropriate.

As a plasticizer for the latex adhesive, the usual rosin may be utilized. However, we have found that the aging properties of latex adhesives may be substantially improved by utilizing hydrogenated forms of plasticizers, for instance, hydrogenated rosin, hydrogenated ester gum or the liquid form of synthetic hydrogenated rosin, namely hydrogenated methyl abietate. Hydrogenated rosin and hydrogenated ester gum, like rosin, are normally solid resins which act as plasticizers for latex.

These plasticizer ingredients may be dispersed or emulsified in an aqueous or other dispersion and especially with the aid of dispersing agents, such as triethanolamine.

Suitable rubber preservatives, antioxidants or thickening ingredients may be added, as desired. For instance, such fillers as colored pigments, kaolin, zinc oxide or titanium dioxide may be utilized. However, in its simpler aspect, the adhesive is of high transparency, and such thickeners as methyl cellulose increase viscosity as for spreading purposes, without detrimentally affecting the transparent character of the adhesive.

Furthermore, where firm adhesion of the adhesive to backings which have an affinity for water is contemplated, various water soluble or water absorptive adhesives may be introduced into the dispersion to act as protective colloids. Included in this category are such ingredients as casein, gum arabic, karaya gum or tragacanth, glue and gelatin.

As a suitable formula for an adhesive of this type we set forth the following (all parts by weight, except where otherwise noted):

(A) Rosin constituent _____ 256
    Non-volatile liquid plasticizer (hydrogenated methyl abietate) _____ 128
(B) Water _____ 68
    Preservative—88% phenol (optional)_____ 1
    Casein _____ 16
    Triethanolamine _____ 8
(C) (Optional) 6.67% Tylose S. L. 400 (methyl cellulose) or 10% solution of gum arabic____ 135
    Additional water _____ 52
(D) 60% latex ____ 345 } or 60% latex _____ 383.3
    60% Vultex___ 38.3
    Water _____ 100

As shown by the formula, it is preferred to form these ingredients separately, heating A to about 212° F. and then adding B to A, and C to D, if C is used, and finally, the rosin emulsion, when cold, may be mixed with the previously combined latex and thickener emulsion.

Instead of heating component A to secure mixture of the rosin constituent and the non-volatile liquid plasticizer, the two ingredients may be dissolved in a volatile solvent such as toluene. Then A may be added to B. The presence of a rubber solvent such as toluene may, however, permit a slight depolymerizing action on the latex after the aqueous film has substantially dried but before complete evaporation of the volatile solvent, and therefore, where best aging results are desired, the toluene is omitted, the rosin constituent merely being dissolved with heat in the liquid solvent plasticizer, as above directed. A highly polymerized rubber content in the final adhesive, unaffected by volatile latex solvents, is thereby insured.

As one instance of a novel use of such an adhesive we have found that such an adhesive has a special affinity for metal foils. Such affinity would not be expected because of the well-known difficulty of anchoring rubber compositions to metal surfaces. Furthermore, metal foils have smooth surfaces which class them as backings which would not hold single coat applications of pressure-sensitive adhesives sufficiently to prevent lamination of the combined structure when unrolled from a roll.

As to the first difficulty, it is well known that the art is replete with various solutions for bonding rubber compositions to metal surfaces. However, almost all solutions of this problem call not only for chemically or mechanically cleaning the metal surface, but also teach necessary application of a priming coat of such materials as resinous pitch, rubber rich in resins, varnishes, rubber hydrochloride or the like. By the use of the adhesive described herein, and constituting one aspect of this invention, these elaborate priming procedures may be dispensed with in the manufacture of metal foil decorative or masking tape, and even a cleaning of the foil to remove slight grease or dirt films is unnecessary.

In addition, where metal foil is deemed desirable in the art, adequately satisfactory adhesives have not been known. Most adhesives are subject to age limitations. Because of the inherent durability and permanence of metal foils, adhesive masses of long aging quality and permanence are especially indicated. Not only does the adhesive which forms one aspect of this invention fulfill these desiderata, but the adhesive may be applied in a single coating without requiring special cleaning or other preliminary treatment of the metal foil or interposition of priming coats. In fact, no preparatory measures are necessary, despite the use of the rubber base adhesive generally considered of poor adherent quality as far as metal is concerned.

We have found that an adhesive of the type indicated by the formula heretofore given, when spread upon a metallic foil such as zinc, aluminum or tin, results in the production of a single-coat metallic adhesive tape which has a firm adhesive-to-backing bond and which is capable of being rolled upon itself and unrolled without resulting in any "picking" of the adhesive from the side to which it is bonded and without deposit of the adhesive on the uncoated back side of the metallic foil.

As an explanation of the unexpected qualities of the above described adhesive as regards its affinity for metallic foils, it is believed that a cleaning action is produced by the combined actions of the alkalinity from the ammonia usually associated with the latex, the presence of an emulsion, and the usual presence of dispersing agents. Thus the dispersing agents and emulsions tend to cause an emulsification and suspension of inorganic and organic dirts, while alkalinity causes a saponification action and also tends to stabilize the dispersions. The combined effects apparently permit the water soluble gum adhesive present in the outer phase of the emulsion to "grab" the metal as drying proceeds.

As a further explanation for the affinity of this adhesive to the metallic foil, it is thought that the same alkali in the form of ammonia present in the adhesive composition has more or less of a corrosive action on the foil, which should benefit adhesion. In addition, the proteinaceous material present is effective in increasing the affinity. But regardless of whether or not the explanations advanced are completely accurate, the fact remains that in one spreading and drying operation a pressure-sensitive adhesive is firmly bonded to a metallic foil.

Of course, as an equivalent for the volatile alkali in latex, a non-volatile alkali may be substituted where other base ingredient than latex is used, an example being the use of potassium hydroxide in Revertex (highly concentrated latex).

As a further feature of metallic foil tapes made in accordance with this invention, it will be seen that the back surface of the metallic foil retains its oily or greasy film which tends to permit ready unrolling of the tape, especially because of the lack of affinity of the latex adhesive to oily surfaces.

One might anticipate that the adhesive coating on drying would be coated with a thin film of non-pressure-sensitive adhesive due to the water-soluble adhesive present. Actually it has been found that any such film has no substantial effect, probably because it is broken up through shrinkage or for other reasons. Certainly after the adhesive has dried and the tape has been rolled up and unrolled again in the process of cutting and winding during manufacture, there is cause for sufficient mechanical disturbance of the outer surface of the adhesive to disrupt, for all practical purposes, any remaining film of dry adhesive.

When copper foil is desired as the backing, any rubber adhesive would require a copper inhibitor, or better, the use of a Vistanex (isobutylene polymer) base adhesive, unaffected by copper is indicated.

It has been further found that the latex-resin type of adhesive is especially efficient when utilized with glass fabric, woven or otherwise fabricated into flexible sheet backings. Because of the somewhat brittle character or glass fibers, such fabric does not lend itself readily to application of adhesive by a calendering operation and therefore the utilization of a liquid spreading operation is desirable, although only through the use of the novel adhesive of this invention can a tape which has aging quality comparable to a calendered adhesive be obtained.

As other backing materials which may be effectively used with the adhesive, the following may be noted:

Cellulosic fibrous backing materials, as cloth, woven, felted or knit, and impregnated, coated, primed or plain; holland cloth; paper, such as kraft, parchment or glassine, impregnated, coated, primed or plain; various types of "Webril," a trade-marked product of The Kendall Company disclosed in a co-pending application of Reed, Ser. No. 303,021 and comprising an unwoven fibrous sheet material.

Non-fibrous backings, transparent or colored, as regenerated cellulose, moisture-proofed or plain on one or both sides, insolubilized gelatine, cellulose esters, such as cellulose acetate, cellulose butyrate or cellulose propionate, or mixtures thereof, cellulose ethers, such as benzyl cellulose and ethyl cellulose, casein, or rubber hydrochloride.

Elastic fabrics, knit or woven, with and without rubber threads, as lastex or uncovered cut rubber threads, woven weftwise, warpwise or both.

Synthetic resinous backings as polyvinyl esters. Polyamide type backings such as nylon.

Inorganic flexible sheet backings, such as woven or knit glass or asbestos fabrics, metal foils, mica or clay.

Composite backings of paper, metal, or non-fibrous backings laminated with cloth, for instance, marquisettes, lawns, and wide mesh gauzes or preshrunk or shrinkproof or "Sanforized" cloth or laminated with one another, preferably with a water-insoluble laminating adhesive, for instance, a vinyl polymer or Pliolite.

In the case of Cellophane, isobutylene polymer has been found to have especial affinity and Vistanex dispersions are therefore of value in the preparation of adhesives for use on this type of backing. Holland cloth, heretofore considered the epitome of slip sheet material, may be coated with the adhesive and a firm bond is secured even in the case of this highly nonporous surfaced material, due to the water-wettable characteristics of the polysaccharide impregnation. In general, where water-wettable backings are utilized, precautions may be necessary to prevent detrimental wetting out of the backing during the aqueous spreading operation. For instance, a series of transfer rolls may be used to form a thin film of the aqueous emulsion on one roll to which the backing is fed.

While we have heretofore mentioned the incorporation of prevulcanized latex in the adhesive mix, a further aspect of the invention is the incorporation of vulcanizing ingredients for the latex, regardless of whether or not the prevulcanized latex is used. It is an object of the invention to provide a latex-resin type adhesive which may be prepared for application to a backing and applied to the backing without any vulcanizing action on the part of the vulcanizing ingredients. Subsequent application of the pressure-sensitive latex adhesive tape to an article is thereby permitted. Thereafter, the adhesive, when subjected to an arbitrary, and preferably a predetermined and definite temperature, will undergo a vulcanizing action on the part of the vulcanizing ingredients to vulcanize the adhesive into a firm, permanent, non-tacky bond with the article to which the tape has been applied. For instance, in the case of latex, the vulcanizing ingredients may consist of sulphur, an activator in the form of zinc oxide, and an accelerator, all dispersed in water and added to the aqueous dispersion.

Such vulcanizing ingredients may be prepared in the proportions of zinc oxide—10%, sulphur—3%, accelerator—1.5%, the percentages being based on the total rubber content. As will be seen, the aqueous dispersion may be spread and dried at low temperatures, say 70° C., below that at which vulcanization of the latex will be effected and subsequently, after application of the tape to an article, the adhesive may be vulcanized into a firm permanent bond by application of heat, and pressure if desired, say at 105° C. for a period of seven hours.

Of course if a highly transparent adhesive is desired, even though to be subsequently vulcanized, some other activator than the zinc oxide should be utilized. Other forms of vulcanizing agents may be utilized, for instance tuads (tetramethylthiuram disulphide).

Similarly, other vulcanizable ingredients may be substituted for the latex, but of course corresponding changes in the vulcanizing ingredients may be necessary. Thus, polychloroprene or Perbunan may be utilized with inclusion of well known reagents for causing vulcanizing effects in these compounds.

By reason of the aqueous spread, a vast field of backings may be utilized which heretofore would have been destructively attacked by the solvents used in spreading previous rubber pressure-sensitive adhesives. Furthermore, the adhesives herein described may be used as priming coats for other exterior coatings, or successive coatings of the adhesives may be applied where thicker layers of adhesive are indicated. In any case, the adhesive layer may be a thin, stable, pressure-sensitive adhesive coating having qualities of age resistance and heat resistance rendering the coating especially dsirable with metallic foil backings.

We claim:

1. An adhesive tape, including a flexible sheet backing, and a normally tacky, pressure-sensitive, substantially non-depolymerized rubber-resin adhesive mass on one side thereof, said mass comprising the dehydrated residue of a combined aqueous dispersion of latex, a normally solid resin selected from the group which consists of rosin, hydrogenated rosin and hydrogenated glycerol abietate, hydrogenated methyl abietate, and a water-absorptive adhesive.

2. An adhesive tape, including a flexible sheet backing, and a normally tacky, pressure-sensitive, substantially non-depolymerized rubber-resin adhesive mass on one side thereof, said mass comprising the dehydrated residue of a combined aqueous dispersion of rubber, a normally solid resin selected from the group which consists of rosin, hydrogenated rosin and hydrogenated glycerol abietate, hydrogenated methyl abietate, and a water-absorptive adhesive.

3. An adhesive tape as claimed in claim 2, wherein the backing is a flexible inorganic sheet backing.

4. An adhesive tape as claimed in claim 2, wherein the flexible sheet backing is a woven glass fabric.

5. An adhesive tape as claimed in claim 2, wherein the flexible sheet backing is a metal foil.

WARNER EUSTIS.
G. ROBERT ORRILL.

REFERENCES CITED

The following references are of record in the file of this patent:

UNITED STATES PATENTS

| Number | Name | Date |
|---|---|---|
| 2,171,140 | Cornwell | Aug. 29, 1939 |
| 2,118,595 | Eisen | May 24, 1938 |
| 2,142,039 | Abrams | Dec. 27, 1938 |
| 2,179,339 | Little | Nov. 7, 1939 |
| 2,177,627 | Drew | Oct. 31, 1939 |
| 2,114,308 | McGowan et al. | Apr. 19, 1938 |
| 2,285,458 | Pragoff | June 9, 1942 |
| 2,140,265 | Leatherman | Dec. 13, 1938 |